US 6,723,223 B2

(12) United States Patent
Zaitsev et al.

(10) Patent No.: US 6,723,223 B2
(45) Date of Patent: Apr. 20, 2004

(54) ELECTROCHEMICAL MACHINING METHOD WITH OPTIMAL MACHINING PULSE DURATION

(75) Inventors: Alexandr Zaitsev, Ufa (RU); Sergey Bezroukov, Ufa (RU); Igor Leonidovich Agafonov, Ufa (RU); Aleksandr Leonidovich Belogorsky, Ufa (RU); Maxim Smirnov, Ufa (RU); Vladimir Zhitnikov, Ufa (RU)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/140,505

(22) Filed: May 7, 2002

(65) Prior Publication Data

US 2003/0010651 A1 Jan. 16, 2003

(30) Foreign Application Priority Data

May 8, 2001 (EP) ............................................ 01201664

(51) Int. Cl.[7] .............................. B23H 11/00; B23H 3/00
(52) U.S. Cl. ........................ 205/644; 205/641; 205/642; 205/643; 205/645; 205/652; 205/103; 204/228.1; 204/229.8
(58) Field of Search ................................ 205/641, 642, 205/643, 644, 645, 652, 103; 204/228.1, 229.8

(56) References Cited

FOREIGN PATENT DOCUMENTS

| GB | 2074326 A | 4/1981 | ............ G01B/7/14 |
|---|---|---|---|
| WO | WO9951382 | 3/1999 | ............ B23H/3/02 |

*Primary Examiner*—Wesley A. Nicolas

(57) ABSTRACT

For an electromechanical machining of a work piece there is an optimal pulse duration for the machining pulses corresponding to the maximum copying accuracy. Such an optimal pulse duration corresponds to a certain value of the gap. By alternating the machining pulses with measurement pulses it is possible to obtain an accurate information about the gap dimensions on-line during the electrochemical machining process. The process control means (20) are used to automate the electromechanical machining, while keeping it in the optimal mode. For this purpose the process control means (20) comprise the pulse control unit (26) to establish the pulse duration of the voltage pulses to be applied across the gap (4).

18 Claims, 4 Drawing Sheets

ELECTROCHEMICAL MACHINING METHOD WITH OPTIMAL MACHINING PULSE DURATION

Figure 1:
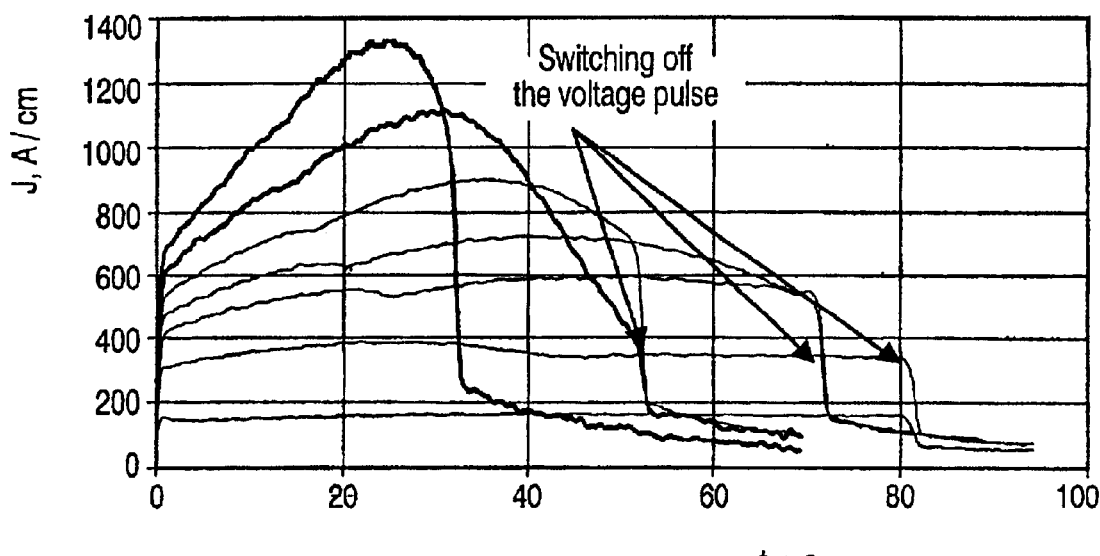

The invention relates to a method for electrochemical machining of an electrically conductive work piece using an electrochemical machining device including a tool electrode opposing the work piece across a predetermined machining gap filled with electrolyte, the electrochemical machining device further comprising means for supplying machining voltage pulses across the machining gap.

The invention also relates to an arrangement for electrochemically machining an electrically conductive work piece by applying electrical machining pulses between the work piece and an electrically conductive electrode while electrolyte is supplied between the work piece and the electrode.

Electrochemical machining is a process in which an electrically conducting work piece is dissolved at the location of an electrode while electrolyte and electric current is supplied. For this purpose, the electrode is brought in the proximity of the work piece and, while electrolyte is fed into the gap between the work piece and the electrode, a powerful current is passed through the work piece and the electrode via the electrolyte, the work piece being positive with respect to the electrode. The current is applied in the form of machining pulses having a given amplitude and duration. In the intervals between the machining pulses, the electrolyte is renewed. Under the working conditions the work piece is being dissolved, thus increasing the value of the gap between the work piece and the electrode. To compensate for this, the electrode and the work piece are moved towards one another with a given feed rate, as a result of which the electrode forms a cavity or eventually a hole in the surface of the work piece, the shape of the cavity or hole having the shape corresponding to the shape of the electrode. This process can be used, for example, for making intricate cavities or holes in or for shaping hardened metals or alloys. The copying precision with which the shape of the cavity or the hole in the work piece corresponds to the shape of the electrode is important for the quality of the result.

A method for electrochemical machining is known from a patent application Publication WO 99/51382. According to the known method, in the intervals between the machining pulses and the passivation pulses for depositing passivation layers on the work piece are applied deliberately. By selecting a proper amplitude and duration of the passivation pulses, the spatial distribution of the passivation layer can be controlled. It is preferable to obtain the passivation layer with higher thickness at the lateral surfaces of the obtained cavity with respect to the passivation layer thickness at the front surface of the cavity. In this case, the dissolution rate at the front surface will be higher with respect to the lateral surfaces, which leads to a better copying accuracy.

The drawback of the known method for improving the copying accuracy is the difficulty associated with the selection of the values for the passivation pulse characteristics as well as gap dimensions with respect to both front and lateral surfaces of the cavity for obtaining a non-uniformly distributed passivation layer. The forming of the passivation layer is influenced by the local electrical field strength. Due to the field in-homogenities caused by the electrode curvature as well as by the precipitations on the cathode surface it is not possible to create the operational condition for an optimal copying accuracy.

It is an object of the invention to provide an electrochemical machining method with a further improved copying precision, where the process control can be optimized.

To this end, the method of the present invention involves an application of a first number of the machining voltage pulses of predetermined optimal duration across the machining gap that is alternated with a second number of measurement voltage pulses across the machining gap in order to measure an actual value of the machining gap.

According to the technical measure according to the invention and based on a fundamental insight of the electrochemical processes in the gap, for each predetermined value of the gap there is a single optimal pulse duration, corresponding to the optimal local copying accuracy. It is understood that, for example in case of the adjacent cavities having different respective depths, the maximum copying precision can be achieved in case the local dissolution efficiencies vary substantially. Such an optimal operating condition is valid for a certain value of the gap. By alternating the machining pulses with measurement pulses it is possible to obtain an accurate information about the gap dimensions on-line during the electrochemical machining. In case the measurement of the gap dimensions shows a value deviating from a preset value, it is possible to alter the operating conditions by bringing the gap back to the predetermined value or by selecting another machining pulse duration, corresponding to the optimal pulse duration for the measured actual value of the gap. It is important to mention, that in case the measurement of the value of the gap positively deviates from the predetermined value, it is preferable to set the system back to the optimal operating conditions by reducing the value of the gap back to the predetermined value.

An embodiment of the method according to the invention is characterized in that the optimal duration of the machining voltage pulses is derived from the maximum value of a localization coefficient for the predetermined value of the machining gap. This technical feature is based on the insight that in case of adjacent cavities the maximum localization coefficient, corresponding to a ratio of local dissolution rates, results in the optimal copying precision. It is further understood that the local anodic dissolution rate is given by the local value of the current density, leading to the conclusion that the localization coefficient (L) is given by the ratio of local current density values $J(\tau, s_i)$ as function of time and the value of the gap:

$$L = \frac{J(\tau, s_1)}{J(\tau, s_2)}, \qquad (1)$$

where:

$s_1$—is the value of the gap corresponding to the first cavity $s_2$—is the value of the gap corresponding to the second cavity.

Thus, in order to calculate the localization coefficient value, it is sufficient to use the information about the temporal behavior of the current density value as function of the gap. Further details are explained later with the reference to the figures.

Another embodiment of the method according to the invention is characterized in that a duration of the measurement voltage pulses is greater than the duration of the machining voltage pulses, the duration of the measurement voltage pulses being selected at least sufficient for a current density pulse across the machining gap to reach the global maximum. This technical measure is based on the fundamental insight that time corresponding with the global maximum of the current density pulse is a function of the absolute value of the applied voltage and the gap. For a given value of the applied voltage the time corresponding with the global maximum of the current density pulse is a direct measure of the absolute value of the gap. As will be explained in detail with reference to the figures the optimal pulse duration for the machining voltage pulses is shorter than the time corresponding to the maximum of the current density pulse. Therefore, the pulse duration for the measurement voltage pulses must be selected so that the global maximum in the current density pulse is reached. Knowing the actual gap dimensions from a previous measurement and using the information about the relation between the actual gap dimension and the corresponding optimal machining voltage pulse one can select the duration of the measurement pulse so that the resulting current density pulse across the gap reaches its global maximum. It is preferable for the polarity of the measurement voltage pulses to correspond to the polarity of the machining voltage pulses.

Another embodiment of the method according to the invention is characterized in that the value of the machining gap is corrected in case the actual value of the machining gap deviates from the predetermined value of the machining gap. Due to the fact that a predetermined value for the gap is selected to achieve a better dissolution and a surface quality of the work piece, it is preferable to correct for the deviation in the value of the gap, in case the measurements show that the actual value of the gap differs from the predetermined value. This gap correction can be performed with the electrode driving means available in the electrochemical machining device.

Another embodiment of the method according to the invention is characterized in that an interval between the machining voltage pulses is set to a value sufficient for renewal of the electrolyte in the machining gap. According to this technical measure it is assured that the operational conditions within the gap are fully recovered, it has been found that for an electrolyte comprising 5% NaCl and the operational conditions of the gap value of 30 μm, applied voltage 50V and the electrolyte pressure of 300 kPa the recovery of the amplitude value of the current density is achieved after 300 μs, while the recovery of the pulse form is obtained after 600 μs. It has further been found that the renewal of the electrolyte is achieved after 600 μs, the electrolyte flow being equal to 3 m/s.

A still further embodiment of the method according to the invention is characterized in that the value of the interval between the machining voltage pulses is derived from a system parameter including an amplitude value of the current density pulse across the machining gap and a time elapsed for the current density pulse to reach the amplitude value. It has been found that a decrease in the interval between the machining pulses leads first to a difference in the dissolution rates along the electrolyte flow followed by a creation of two separate zones. In the first zone every new machining pulse is given in a fresh electrolyte and in the second zone every new machining pulse is given into a heated electrolyte comprising a gaseous phase. This phenomenon causes pitting in the second zone, deteriorating the surface quality of the work piece. Therefore, it is concluded that in order to select the interval between the machining pulses it is more effective to use a system parameter including an amplitude value of the current density pulse across the machining gap and a time elapsed for the current density pulse to reach the amplitude value.

The invention further relates to an arrangement for electrochemically machining an electrically conductive work piece by applying electrical machining pulses between the work piece and an electrically conductive electrode while electrolyte is supplied between the work piece and the electrode.

These and other aspects of the invention will be explained with a reference to the figures.

FIG. 1 presents a schematic impression of the current density pulses across the gap as a function of an applied voltage across the gap.

Figure 2:
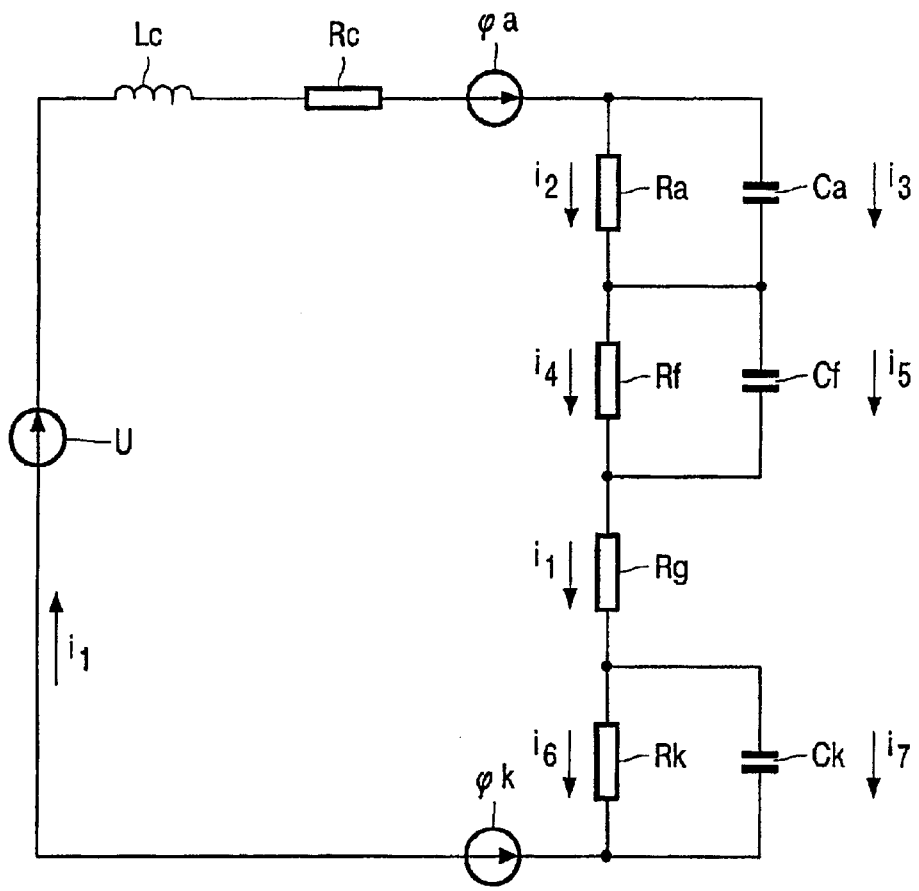

FIG. 2 presents an equivalent electrical circuit to represent a discharge circuit for an electrochemical cell.

Figure 3:
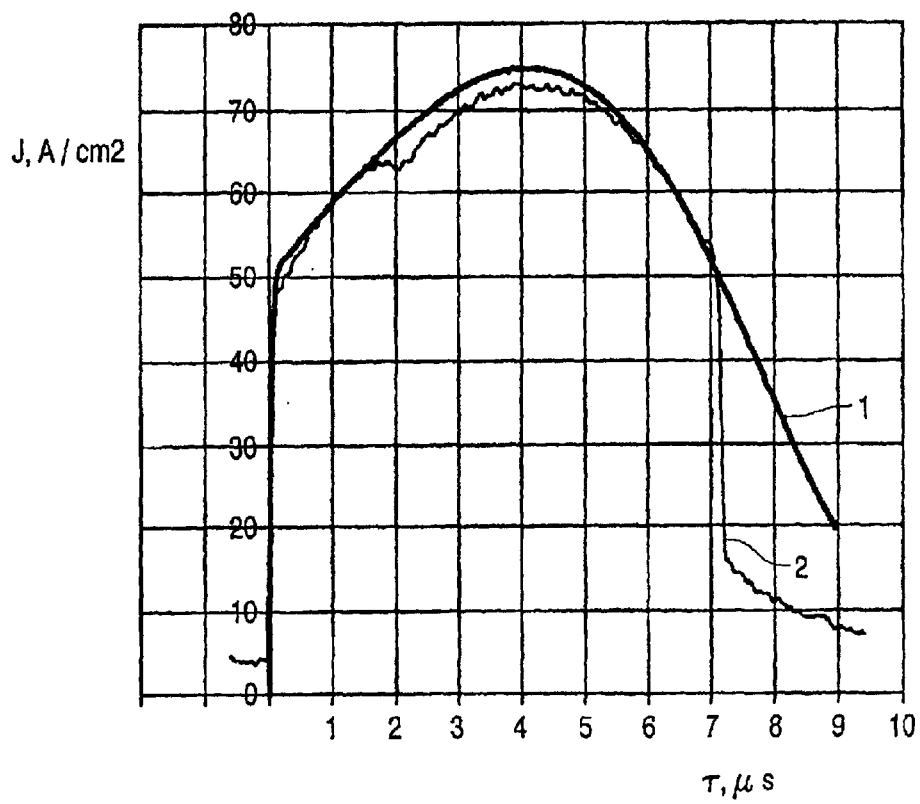

FIG. 3 presents a comparison of the calculated current density pulse in the gap against measured values.

Figure 4:
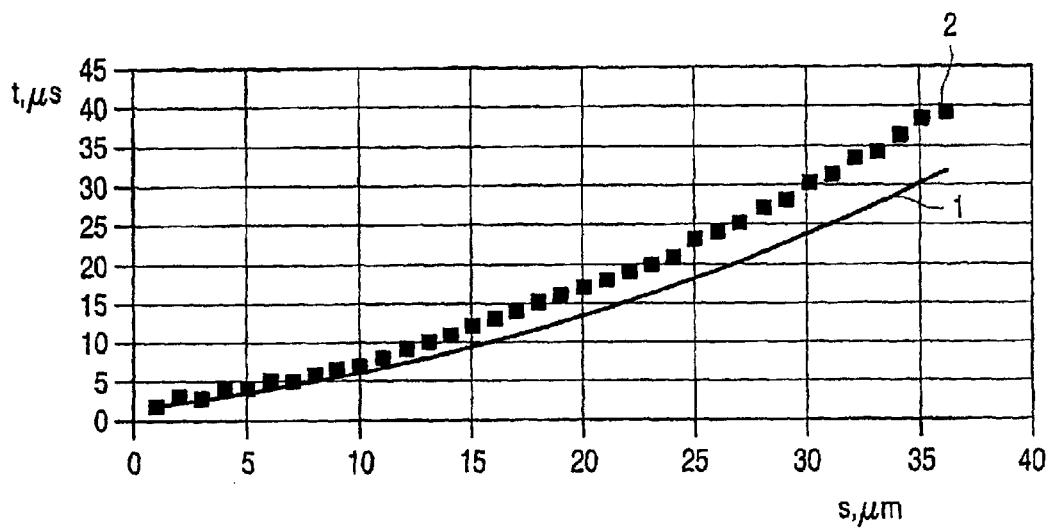

FIG. 4 presents the optimal duration of the machining pulse and the position of the global maximum of the current density pulse as functions of the value of the gap dimensions.

Figure 5:
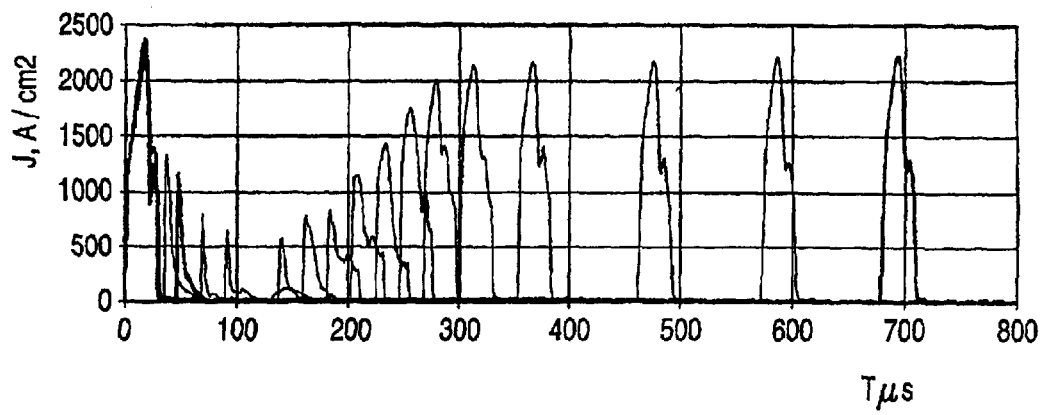

FIG. 5 presents the shapes of the current density pulses in the gap as a function of the period of the applied voltage pulses.

Figure 6:
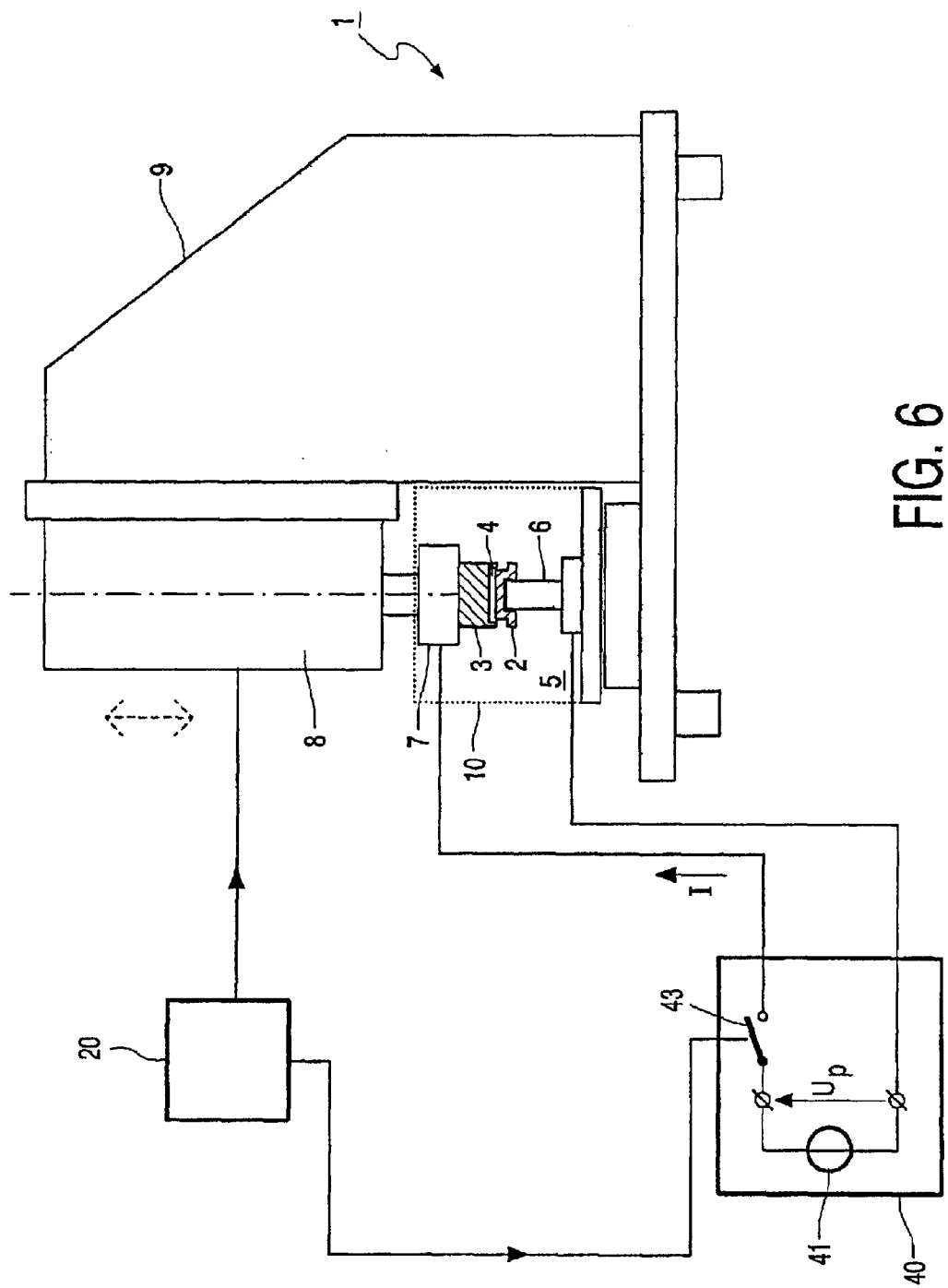

FIG. 6 presents a schematic view of an arrangement for electrochemically machining of an electrically conductive work piece.

Figure 7:
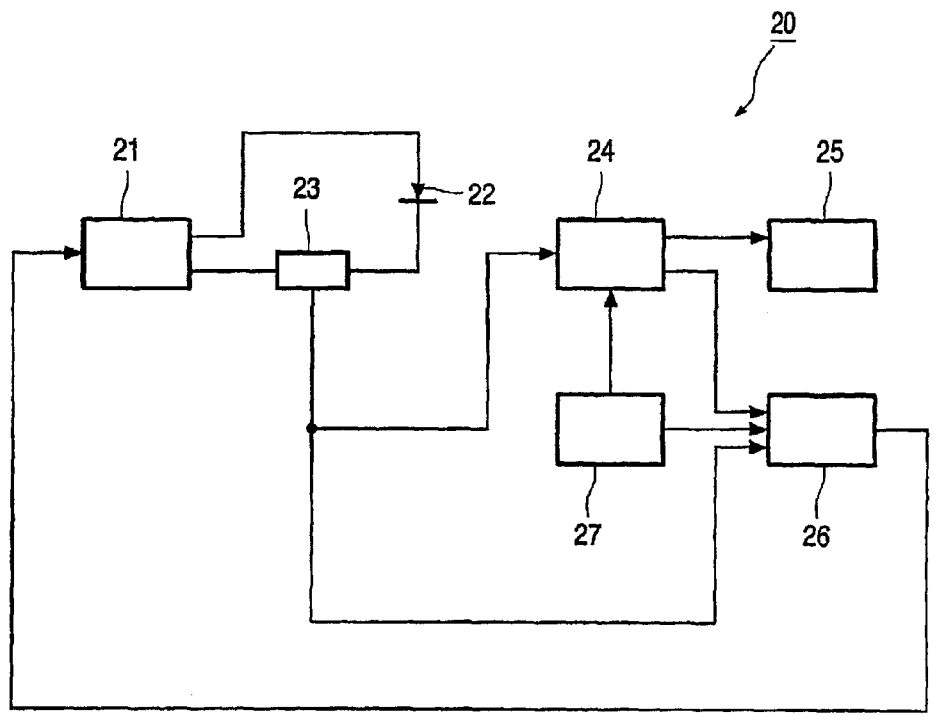

FIG. 7 presents a schematic functional block-scheme of the process control means.

Characteristic current density pulses are given in FIG. 1 for a fixed gap value and different amplitude values of rectangular voltage pulses. Increasing the absolute value of applied voltage results in increasing the maximum value of the current density pulse, the maximum being reached after shorter times. As is seen from the FIG. 1, an extremum in the current density pulse, further referred to as the global maximum, is developed beyond a certain value of the applied voltage pulse. This global maximum is due to two contradictory phenomena in the gap—first, an intense heating of the electrolyte and secondly a continuos growth of the gaseous phase in the electrolyte. It is further understood that the absolute value of the global maximum of the current density pulse is determined by the absolute value of the voltage pulse and by the value of the gap. The influence of these two factors is dominant for small gap dimensions and high amplitudes of the voltage pulse, for example for gap dimensions in the range of s=20–30 μm and for an applied voltage of about 90V.

FIG. 2 presents an equivalent electric circuit for modeling the discharge circuit of the electrochemical cell. In the frame of this model the following assumptions are made:

the electrolyte is a two-phase continuum;

the gaseous phase consists of the hydrogen, evolving due to the H electrolysis;

due to electrolyte viscosity the gaseous phase builds an additional pressure in the gap;

the heating of the electrolyte is adiabatic; and the electrode potentials are constant and are equal to their stationary values.

By applying the basic electrochemical knowledge, one skilled in the art can deduce the equations for the currents, as indicated in FIG. 2:

$$\frac{di_1}{dt} = \frac{1}{L_c}[U + \varphi_a - \varphi_k - R_1 i_1 - R_a i_2 - R_p i_4 - R_{ecm} i_1 - R_k i_6], \quad (2)$$

$$\frac{di_2}{dt} = \frac{1}{R_a C_a}(i_1 - i_2), \quad (3)$$

$$\frac{di_4}{dt} = \frac{1}{R_f C_f}(i_1 - i_4), \quad (4)$$

-continued $$\frac{di_6}{dt} = \frac{1}{R_k C_k}(i_1 - i_6) \quad (5)$$

where

U is the applied machining voltage;

$R_{a,k}$ is the equivalent Faraday resistance of the anode, respectively cathode reaction;

$R_g$ is the resistance of the electrolyte layer in the gap;

$R_f$ is the resistance of the oxide layer on the anode;

$C_f$ is the equivalent capacitance of the oxide layer on the anode;

$C_{a,k}$ is the capacitance of the double electrical layer of the anode, respectively cathode;

$R_c$ is the resistance of the cables;

$L_c$ is the induction of the cables;

$\phi_{a,k}$ is the anode, respectively the cathode potential.

Based on this model a current density pulse is tabulated and compared with the experimental results (FIG. 3 curves 1,2, respectively). Due to the good correlation of the tabulated value of the current density pulse 1 and the measured current density pulse 2 across the gap, it is possible to use the model for optimization of the localization coefficient (L). From equation (1) one can deduce a slope parameter K for the value of the localization coefficient L, given as follows:

$$K_L(\tau, s) = -\frac{d(J_{cp}(\tau, s))}{ds}, \quad (6)$$

where $$J_{cp}(\tau, s) = \frac{\int_0^\tau J(t, s)dt}{\tau} \quad (7)$$

τ—duration time for the current density pulse

J(τ,s)—current density function, obtained from the model.

The slope parameter K can be further used for optimization of the process parameters, like the duration of the machining voltage pulses to obtain the maximum localization coefficient. For example, the optimal pulse duration for a given value of the gap must satisfy the following conditions:

$$\frac{\partial K(\tau, s)}{\partial \tau} = 0; \quad (8)$$

$$\frac{\partial^2 K(\tau, s)}{\partial \tau^2} < 0 \quad (9)$$

The conditions (8) and (9) define an optimal curve in the s-t space (given by a solid line 1 in the FIG. 4) on which the value of the localization coefficient for each s-t combination is maximal. Using this curve the duration of the optimal machining pulse for each certain value of the machining gap is obtained. As is seen from FIG. 4 for a given gap dimension the optimal machining pulse duration, given by the curve 1 is smaller than the duration of the pulse sufficient for the current density pulse to reach the global maximum, given by the curve 2. This phenomenon is further used in an embodiment of a process control means used for an electrochemical machining arrangement.

FIG. 5 presents the shapes of the current density pulses in the gap as a function of the period of the applied machining voltage pulses. The shape of the resulting current density pulse gives information about the recovery of the electrolyte after an application of a voltage pulse. It has been found that a decrease in the interval between the machining pulses leads first to a difference in the dissolution rates along the electrolyte flow followed by a creation of two separate zones. In the first zone every new machining pulse is given in a fresh electrolyte and in the second zone every new machining pulse is given into a heated electrolyte comprising a gaseous phase. This phenomenon causes pitting in the second zone, deteriorating the surface quality of the work piece. Therefore, it is concluded that in order to select the interval between the machining pulses it is efficient to use a system parameter including an amplitude value of the current density pulse across the machining gap and a time elapsed for the current density pulse to reach the amplitude value. For the gaps of 30 μm and applied voltage of 50V with an electrolyte pressure of P=300 kPa it has been found that a sufficient recovery of the system occurred after at least 300 μs.

FIG. 6 presents a schematic view of an arrangement 1 for electrochemically machining of an electrically conductive work piece 2 by means of an electrode 3. The arrangement 1 comprises a base 6 for positioning a work piece 2, a holder 7 for positioning an electrode 3, and an actuator 8 for moving the holder 7 and the base 6 with respect to one another. The base 6 and the actuator 8 are mounted on a chassis 9 having a rigid construction so as to enable a working distance between the electrode 3 and the work piece 2 to be set with a high accuracy. The arrangement comprises further a reservoir 10 filled with an electrolyte 5 in such a manner that the gap 4 formed as a result of the working distance between the electrode 3 and the work piece 2 is filled with the electrolyte 5. In the present case the electrolyte comprises NaNO3 dissolved in water. As an alternative it is possible to use another electrolyte, such as for example NaCl or a combination of NaNO3 and an acid. The electrolyte 5 is pumped through the gap 4 by means of an installation, not shown in the figure. By means of the arrangement 1 the work piece 2 can be machined be passing a machining voltage pulse from a power supply unit 40 through the electrolyte 5 in the gap 4 via the electrode 3 and the work piece 2. The power supply unit 40 comprises a voltage pulse generator 41 and a controllable switch 43. When the polarity of the applied machining voltage is correct this results in material of the work piece 2 being removed from its surface and being dissolved in the electrolyte 5 at the location of a small distance between the electrode and the work piece. The shape of thus obtained cavity is determined by the shape of the electrode opposite to it. The arrangement comprises further process control means 20 to determine the actual dimension of the value of the gap and to install the value of the gap back to the predetermined value in case a deviation in the value of the gap occurred on one hand, and to apply optimal machining voltage pulses and measuring voltage pulses on the other hand. The voltage pulse duration to be applied to the gap by the power supply unit is determined and controlled by the process control means 20 by means of a computing unit, not shown in the figure, which operate the switch 43.

FIG. 7 presents a schematic functional block-scheme of the process control means 20. Pulsed power supply generator 21 generate machining voltage pulses of an optimal duration, corresponding to the predetermined value of the installed gap according to FIG. 4. The technological advantages of electrochemical machining by voltage pulses of micro-second duration are obtained for the current density values in a range between 1000 . . . 20000 A/cm² and a duration of the voltage pulse front less than 1000 nc. It is preferable to use an a-priori known look-up tabulated values for the optimal pulse duration as a function of the value of the gap, stored in a look-up calibration table. These predetermined values can be obtained as a result of the calibration experiment for a given set-up, or can be calculated using the model, discussed above. The pulse duration of the applied voltage pulses is controlled by the pulse control unit 26. For the period of the machining voltage pulses the pulse control unit 26 installs the optimal voltage pulse duration according to the data of the look-up calibration table. The pulse control unit further operates the switch of the power supply generator, not shown in the figure. The voltage pulses are then applied across the gap 22, resulting in a current density pulse being developed across the gap, as is schematically shown in FIG. 1 for the curves having the global maximum. The current density pulse is detected by a shunt 23 and is supplied to a computing unit 24. The current density pulse, measured by the shunt 23 constitutes a control signal further used in the process control means 20. In order to measure the actual gap dimensions the measuring block 27 is incorporated into the process control means 20. This block determines the frequency of the measurement samples. For the time interval corresponding with a measurement sample, the measuring block 27 feeds a signal to the pulse control unit 26 to increase the duration of the voltage pulses with respect to the machining voltage pulses. The duration of the voltage pulses is selected by the computing unit 24 based on the previous gap measurement data and on the information on the time for the current density pulse to reach the global maximum. When the measurement voltage pulses are fed to the gap 22, the corresponding current density pulse is analyzed by the computing unit 24 and the corresponding actual elapsed time to reach the global maximum is determined. Based on this data the computing unit 24 calculates the actual value of the gap, using the data of the look-up calibration table.

The computing means 24 calculate the actual value of the gap based on the look-up calibration table comprising a relationship between the value of the gap, optimal pulse duration and the elapsed time for the current density pulse to reach the global maximum. The computing means 24 then compares this value with the predetermined value of the gap and, if a deviation is detected, calculates the gap correction value. To correct for the deviation in the actual gap value a correction signal is sent by the computing unit 24 to the actuator 25, determining the working distance between the electrode and the work piece. After this operation has been fulfilled, the pulse control unit 26 sets the voltage pulse duration corresponding to the optimal value for the machining voltage pulses and the electrochemical machining of the work piece is carried on. According to this embodiment it is possible to machine the work piece with the optimal machining voltage pulses which improves the copying accuracy of the final product. Due to the possibility to alternate the machining pulses with measuring pulses it is possible to probe the operational conditions, like the actual value of the gap on-line. Any deviation of the actual value of the gap from the predetermined value is corrected leading to the machining of the work piece maximally in the optimal mode. This feature makes it possible to construct an automated process control, of a kind described above, in order to further optimize the on-line process control of the electrochemical machining.

What is claimed is:

1. A method for an electrochemical machining of an electrically conductive work piece using an electrochemical machining device including a tool electrode opposing the work piece across a machining gap of a predetermined value that is filled with an electrolyte, said method comprising:
    applying a plurality of machining voltage pulses of a predetermined optimal duration across the machining gap; and
    subsequently applying a plurality of measurement voltage pulses across the machining gap in order to measure an actual value of the machining gap.

2. The method of claim 1, further comprising:
    deriving the predetermined optimal duration of the machining voltage pulses from a maximum value of a localization coefficient for the machining gap.

3. The method of claim 1, further comprising:
    selecting a duration of the measurement voltage pulses for enabling a current density pulse across the machining gap to reach a global maximum.

4. The method of claim 3,
    wherein the duration of the measurement voltage pulses is greater than the optimal duration of the machining voltage pulses.

5. The method of claim 3, further comprising:
    determining a value of an elapsed time corresponding to the global maximum of the current density pulse.

6. The method of claim 5, further comprising:
    deriving the actual value of the machining gap as a function of the value of the elapsed time.

7. The method of claim 6, further comprising:
    correcting a value of the machining gap in response to the actual value of the machining gap deviating from the predetermined value of the machining gap.

8. The method of claim 1, further comprising:
    setting an interval between the machining voltage pulses to a value for renewing the electrolyte in the machining gap.

9. The method of claim 1, further comprising:
    deriving a value of an interval between the machining voltage pulses from a system parameter including an amplitude value of a current density pulse across the machining gap and a time elapsed for the current density pulse to reach the amplitude value.

10. An apparatus for an electrochemical machining of an electrically conductive work piece using an electrochemical machining device including a tool electrode opposing the work piece across a machining gap of a predetermined value that is filled with an electrolyte, said apparatus comprising:
    means for applying a plurality of machining voltage pulses of a predetermined optimal duration across the machining gap; and
    means for subsequently applying a plurality of measurement voltage pulses across the machining gap in order to measure an actual value of the machining gap.

11. The apparatus of claim 10, further comprising:
    means for deriving the predetermined optimal duration of the machining voltage pulses from a maximum value of a localization coefficient for the machining gap.

12. The apparatus of claim 10, further comprising:
    means for selecting a duration of the measurement voltage pulses for enabling a current density pulse across the machining gap to reach a global maximum.

13. The apparatus of claim 12,
    wherein the duration of the measurement voltage pulses is greater than the optimal duration of the machining voltage pulses.

14. The apparatus of claim 12, further comprising:

means for determining a value of an elapsed time corresponding to the global maximum of the current density pulse.

15. The apparatus of claim 14, further comprising;

means of deriving the actual value of the machining gap as a function of the value of the elapsed time.

16. The apparatus of claim 15, further comprising:

means for correcting a value of the machining gap in response to the actual value of the machining gap deviating from the predetermined value of the machining gap.

17. The apparatus of claim 10, further comprising:

means for setting an interval between the machining voltage pulses to a value for renewing the electrolyte in the machining gap.

18. The apparatus of claim 10, further comprising:

means for deriving a value of an interval between the machining voltage pulses from a system parameter including an amplitude value of a current density pulse across the machining gap and a time elapsed for the current density pulse to reach the amplitude value.

* * * * *